UNITED STATES PATENT OFFICE.

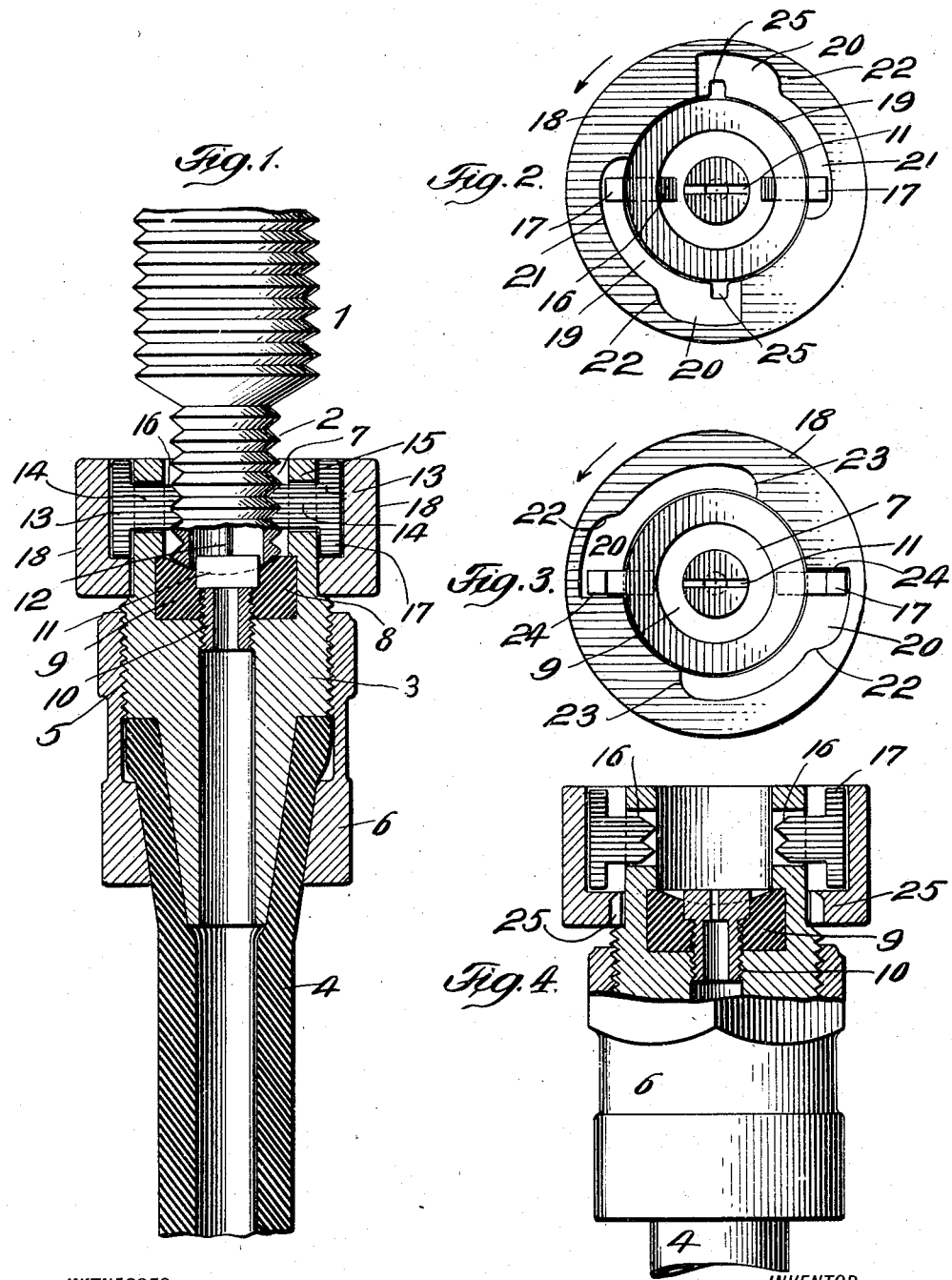

CHARLES W. BECK, OF ROCKVILLE CENTER, NEW YORK, ASSIGNOR, BY MESNE ASSIGNMENTS, TO BECK-FROST CORPORATION, OF DETROIT, MICHIGAN, A CORPORATION OF MICHIGAN.

DEVICE FOR CONNECTING AIR-HOSE TO PNEUMATIC-TIRE VALVES.

1,211,387.      Specification of Letters Patent.      Patented Jan. 9, 1917.

Substitute for application Serial No. 605,752, filed January 31, 1911. This application filed March 15, 1912. Serial No. 684,077.

*To all whom it may concern:*

Be it known that I, CHARLES W. BECK, a citizen of the United States, and resident of Rockville Center, county of Nassau, State of New York, have invented certain new and useful Improvements in Devices for Connecting Air-Hose to Pneumatic-Tire Valves, of which the following is a specification.

The main object of this invention is to provide means for quickly and rigidly connecting an air supplying hose to a tire-valve of a pneumatic tire. To obtain this object I provide a gripping device adapted to engage the threads on the end of the tire-valve to thereby rigidly lock the air hose to said valve and to prevent it being disconnected from the valve, or blown off, by the air pressure.

Another object of the invention is to provide a connecting device which may be interlocked with the threads on the tire valve by a partial rotation of one member of the locking device, so that the device may be very quickly attached to the tire-valve, and readily disconnected therefrom.

Another object of the invention is to provide a device of simple construction, which may be readily and cheaply manufactured and which will be durable and efficient in use.

In the drawing, Figure 1 is a longitudinal central sectional view of the device attached to an air-hose and applied to a tire-valve; Fig. 2 an end view of the device with the parts in their locked position as shown in Fig. 1; Fig. 3 a view similar to Fig. 2 with the parts in their unlocked or released position; and Fig. 4 a partial central longitudinal sectional view with the parts in position shown in Fig. 3, that is to say in their unlocked or released position.

Referring to the various parts by numerals, 1 designates a tire valve, which, as in the usual practice, is provided with a reduced externally threaded end 2. The connecting device consists of a base or body part 3 having a tapered outer end over which the air hose 4 is forced; and with an externally threaded part 5 on which the hose-retaining sleeve 6 is threaded. This sleeve 6, clamps the air hose on the tapered part of the base, as indicated clearly in Fig. 1.

The base or body-part of the connecting device is formed at its free end with a longitudinally extending central recess or cavity 7 which is slightly enlarged at its inner end to form an annular cavity 8. This cavity is for the reception of a yielding sealing-plug 9, preferably of rubber or similar material. This rubber sealing plug is slightly larger in diameter than the recess 7 and when forced through said recess into the cavity 8 expands and fills said cavity. After it has expanded in the cavity 8 it will be held therein against accidental displacement. The cavity or recess 7 is slightly larger in diameter than the reduced threaded end of the tire-valve so that said portion of the valve may be inserted in said cavity and the end thereof be brought to bear directly on the yieldable sealing-plug 9, as shown clearly in Fig. 1 of the drawing. The base or body part of the connecting device is bored longitudinally to permit of the passage of air therethrough and in the outer end thereof is fixed a longitudinally apertured, rigid valve opening plug 10. This rigid plug extends through the yieldable sealing plug and its outer end is formed with a transverse cut 11 whose inner end is in communication with the longitudinal aperture of the plug as shown clearly in the drawing. When the threaded reduced end of the tire valve is inserted in the cavity 7 and brought against the seat formed by the yieldable sealing-plug 9, the end of the rigid plug 10 engages the stem 12 of the tire-valve and unseats the same, so that the air may pass freely from the air hose into the tire. A portion of the stem of the tire valve is shown in Fig. 1 of the drawing. It will, of course, be understood that the outer end of the rigid valve-opening plug 10 projects outwardly beyond the outer surface of the sealing-plug, so that when the tire valve is brought to rest on the yieldable seat 9 the said valve-opening plug 10 will project slightly into the tire-valve casing 2. While the valve opening plug 10 is shown as threaded into the base or body part of the connecting device, it is obvious that it may be secured therein in any suitable manner.

To lock and rigidly hold the connecting device to the threaded end of the tire-valve casing I provide two oppositely disposed radially movable locking-jaws 13, whose inner surfaces are serrated to adapt them to engage and fit into the threads on the tire-valve casing. Each of these jaws is formed with a body part 14 which is adapted to reciprocate through radial slots 15 formed in the base 3 near the outer end thereof, said slots opening into the central cavity or recess 7. Each jaw is formed on its inner surface with the inwardly extending teeth 16 which are adapted to fit into and engage the external screw threads on the tire-valve casing. Each jaw is also formed at its outer end with a head 17 which limits the inward movement of the jaw, as shown clearly in Figs. 1 and 2, the inner surfaces of said heads being adapted to engage, or approximately engage, the outer surface of the base or body part of the connecting device when the inner toothed or serrated ends of the jaws are engaged in the threads of the valve casing.

To move the locking jaws inwardly to bring their serrated or toothed ends into engagement with the threads of the tire valve casing, a rotatable cam-sleeve 18 is mounted on the outer end of the body part 3, said sleeve being formed at diametrically opposite points, with recesses 19. These recesses are enlarged at 20 as shown clearly in Figs. 2 and 3, and are reduced at 21, also shown in said figures. Between the two portions of the recess 19 is formed a cam surface 22 which is adapted to engage the outer surfaces of the heads of the gripping-jaws to force them inwardly when the cam-sleeve is rotated in the direction indicated by the arrows in Figs. 2 and 3. When the cam-sleeve is rotated to the position shown in Fig. 3, the locking jaws are free to move outwardly into the enlarged portion 20 of the recess 19. In this position of the sleeve the large portions of the recess 19 are in a position to receive the jaws and to permit them to move radially outwardly and this permits the serrated or toothed ends of said jaws to be drawn out of the cavity 7, as shown clearly in Figs. 3 and 4 of the drawing. The device is then in position to be placed over the end of the tire valve casing. By a slight rotation of the cam-sleeve, as indicated in Fig. 3, the cams 22 will engage the headed ends of the clamping-jaws and force them inwardly, thereby permitting the reduced portions of the recesses 19 to be brought into line with the heads 17 of the clamping-jaws, the outer walls of said reduced portions of the recesses then retaining the locking-jaws in their inner locked position, as shown clearly in Figs. 1 and 2. It will, of course, be understood that when the cam sleeve is in the position shown in Fig. 3 to release the locking dogs if said dogs project into the cavity 7, and it is desired to place the device over the tire valve or to withdraw it from the tire valve, the action of the threads of the valve casing on the teeth of the locking dogs would be such as to force the said jaws outwardly. To force the jaws inwardly and to lock the device to the air hose it is only necessary to give the cam sleeve a partial rotation in the direction indicated by the arrows in Figs. 2 and 3.

The end walls 23 and 24 of the recesses 19 form stops which are adapted to contact with the sides of the locking jaws to limit the rotation of the cam sleeve.

The cam sleeve is formed with slots 25 which open into the recesses 19, as shown clearly in Figs. 2 and 4, and said slots are primarily formed large enough to permit the heads of the jaws 13 to pass through them. By this means the cam sleeve may be passed over the end of the body part or base of the connecting device and interlocked with the heads of the clamping jaws. When the cam sleeve is thus placed in position the metal around the slots is crushed or forced inwardly to partially close the slots, as indicated in Figs. 2 and 4, to prevent the disengagement of the cam sleeve from the base piece. It will, of course, be understood that these slots may be closed by a suitable means and in any suitable manner.

From the foregoing it is manifest that I provide a very simple and convenient means for attaching an air hose to a tire valve casing, and which will be durable and efficient in actual use. It is also clear that I provide means for locking the air hose to a tire valve which may be operated to connect or disconnect it from the tire valve by less than a quarter turn of the cam sleeve, and which when in position will be as securely held as it would be if a regular screw-threaded connecting means were employed which had to be rotated many times to properly connect the air hose tightly to the air valve casing. It is manifest that my device has many other advantages.

What I claim is:

1. A device of the class described comprising a base longitudinally bored and formed with a longitudinally extending cavity at one end, a yieldable seating plug in said cavity, a rigid valve-opening plug projecting into said cavity, said plug being bored for the passage of air, a pair of radially movable locking jaws carried by said base and adapted to project into the said cavity outside of or beyond the yielding seating plug and formed with thread-engaging teeth on their inner surfaces, heads formed on the outer ends of said jaws, said heads engaging the outer surface of the base to limit the inward movement of said jaws, a cam ring carried by the said base and inclosing and protecting the jaws and formed with recesses to receive the outwardly projecting head portions thereof, the outer walls of said recesses forming cam surfaces adapted to force the jaws inwardly when the cam sleeve is rotated in the proper direction, the end walls of said recesses forming stops to limit the rotation of the cam sleeve in either direction.

2. A device of the class described comprising a base longitudinally bored and formed with a longitudinally extending cavity at one end, a yieldable seating plug in said cavity, a rigid valve-opening plug projecting into said cavity, said plug being bored for the passage of air, a pair of radially movable locking jaws carried by said base and adapted to project into the said cavity outside of or beyond the yielding seating plug and formed with thread-engaging teeth on their inner surfaces, heads formed on the outer ends of said jaws, said heads engaging the outer surface of the base to limit the inward movement of said jaws, a cam ring carried by the said base and inclosing and protecting the said jaws and formed with recesses to receive the outwardly projecting head portions thereof, the outer walls of said recesses forming cam surfaces adapted to force the jaws inwardly when the cam sleeve is rotated in the proper direction, the end walls of said recesses forming stops to limit the rotation of the cam sleeve in either direction and the heads of the jaws locking the cam ring to the base.

3. A device of the class described comprising a base longitudinally bored and formed with a longitudinally extending cavity at one end, a yieldable seating plug in said cavity, a rigid valve-opening plug projecting into said cavity, said plug being bored for the passage of air, a pair of radially movable locking jaws carried by said base and adapted to project into the said cavity outside of or beyond the yielding seating plug and formed with thread-engaging teeth on their inner surfaces, heads formed on the outer ends of said jaws, said heads engaging the outer surface of the base to limit the inward movement of said jaws, a cam ring carried by the said base and formed with recesses to receive the outwardly projecting head portions of the locking jaws, the outer walls of said recesses forming cam surfaces adapted to force the jaws inwardly when the cam sleeve is rotated in the proper direction, the end walls of said recesses forming stops to limit the rotation of the cam sleeve in either direction and the heads of the jaws locking the cam ring to the base, the cam ring being provided with longitudinally extending slots adapted to be brought into register with the heads of the locking jaws when said cam ring is in its unlocked position.

4. A device of the class described comprising a base formed with a longitudinally extending cavity at one end, a yielding seating plug in said cavity, a valve lifting plug carried by said base and extending above the yieldable seating plug, a series of radially movable jaws formed with screw engaging teeth on their inner surfaces, a rotatable cam ring inclosing said jaws and adapted to force them inwardly as said ring is rotated, and heads formed on the locking jaws outside of the base and within the said ring, said heads fitting in recesses formed in the cam ring and serving to lock said ring to the base.

5. A hose coupling, comprising a base, a radially movable jaw engaged with said base and formed with thread engaging teeth on its inner surface, a cam ring rotatably carried by the base for forcing said jaw inward when said ring is rotated, and means upon said jaw for locking the ring to the base.

6. A device of the class described, comprising a base formed with a longitudinally extending cavity at one end, a pair of radially movable jaws oppositely mounted in the walls of said cavity, formed with screw engaging teeth at their inner ends, and having heads at their outer ends, and a cam ring rotatable upon said base, and formed with recesses to receive the heads of said jaws, said cam ring being rotatable to force said jaws inward, the engagement of the dogs with said base and ring acting to prevent displacement of the ring from the base.

7. A device of the character described, comprising a base having a cavity for the reception of a threaded member, and having a portion for engagement with a hose, said portion being formed with an air passage extending to said cavity, a cam ring mounted upon the base, and a pair of locking jaws mounted in opposite slots in the wall of said cavity, said jaws having their adjacent ends formed with teeth for engaging the threads of a member introduced into said cavity, the cam ring having radial slots to allow introduction of the dogs into the same.

In testimony whereof I hereunto affix my signature in the presence of two witnesses.

CHARLES W. BECK.

Witnesses:
SARAH J. ANTAYA,
W. S. McDONALD.